US009577472B2

(12) United States Patent
Saito et al.

(10) Patent No.: US 9,577,472 B2
(45) Date of Patent: Feb. 21, 2017

(54) POWER MANAGEMENT APPARATUS, POWER MANAGEMENT METHOD AND DEMAND NOTIFICATION APPARATUS

(71) Applicant: Sony Corporation, Tokyo (JP)

(72) Inventors: Junko Saito, Kanagawa (JP); Taro Tadano, Chiba (JP); Ryoki Honjo, Kanagawa (JP)

(73) Assignee: Sony Corporation, Tokyo (JP)

( * ) Notice: Subject to any disclaimer, the term of this patent is extended or adjusted under 35 U.S.C. 154(b) by 670 days.

(21) Appl. No.: 13/667,447

(22) Filed: Nov. 2, 2012

(65) Prior Publication Data
US 2013/0116842 A1 May 9, 2013

(30) Foreign Application Priority Data
Nov. 9, 2011 (JP) .................... 2011-245413

(51) Int. Cl.
| | | |
|---|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *H02J 13/00* | (2006.01) |
| *H02J 3/00* | (2006.01) |

(52) U.S. Cl.
CPC .......... *H02J 13/00* (2013.01); *H02J 2003/003* (2013.01); *Y04S 10/54* (2013.01)

(58) Field of Classification Search
CPC ........ Y04S 10/50; Y04S 10/54; Y04S 20/222; Y04S 20/224; H02J 2003/003; H02J 3/00; Y02B 70/3225

USPC .......................................... 700/286, 291, 295
See application file for complete search history.

(56) References Cited

U.S. PATENT DOCUMENTS

| | | | | |
|---|---|---|---|---|
| 4,916,328 | A * | 4/1990 | Culp, III ................... | H02J 3/14 307/39 |
| 7,778,738 | B2 * | 8/2010 | Taft ............................... | 700/295 |
| 8,068,938 | B2 * | 11/2011 | Fujita ........................... | 700/295 |
| 8,768,527 | B2 * | 7/2014 | Tomita et al. ................ | 700/291 |
| 8,972,071 | B2 * | 3/2015 | Meyerhofer et al. ......... | 700/291 |
| 2008/0167756 | A1 * | 7/2008 | Golden et al. ................ | 700/297 |
| 2010/0274402 | A1 * | 10/2010 | Shaffer ......................... | 700/291 |
| 2010/0292856 | A1 * | 11/2010 | Fujita ........................... | 700/291 |
| 2011/0035073 | A1 * | 2/2011 | Ozog ............................ | 700/291 |

(Continued)

FOREIGN PATENT DOCUMENTS

JP          05-018995 A    1/1993

*Primary Examiner* — Ronald Hartman, Jr.
(74) *Attorney, Agent, or Firm* — Chip Law Group (57) ABSTRACT

Disclosed herein is a power management apparatus including: a power-demand forecasting section configured to forecast a power demand made by an electric-power demander at a future time; a power measurement section configured to acquire a power consumption of the electric-power demander for the time; a demand control section configured to determine a demand for urging the electric-power demander to adjust the amount of electric power consumed by the electric-power demander on the basis of the power demand forecasted by the power-demand forecasting section and the power consumption acquired by the power measurement section; and a demand issuance section configured to issue the demand determined by the demand control section to the electric-power demander.

9 Claims, 6 Drawing Sheets

(56) References Cited

U.S. PATENT DOCUMENTS

| | | | |
|---|---|---|---|
| 2011/0184574 A1* | 7/2011 | Le Roux et al. | 700/291 |
| 2011/0190953 A1* | 8/2011 | Park et al. | 700/291 |
| 2011/0202467 A1* | 8/2011 | Hilber et al. | 705/80 |
| 2011/0231028 A1* | 9/2011 | Ozog | 700/291 |
| 2011/0258018 A1* | 10/2011 | Tyagi et al. | 705/7.33 |
| 2012/0109394 A1* | 5/2012 | Takagi et al. | 700/291 |
| 2012/0185105 A1* | 7/2012 | McMullin | 700/291 |
| 2012/0253532 A1* | 10/2012 | McMullin et al. | 700/291 |
| 2012/0316688 A1* | 12/2012 | Boardman et al. | 700/291 |
| 2013/0030583 A1* | 1/2013 | Owen | 700/291 |
| 2013/0254151 A1* | 9/2013 | Mohagheghi et al. | 706/46 |

\* cited by examiner

| DEMAND TYPE | RESPONSE RATE | RANKING |
|---|---|---|
| TURN OFF 1 LIGHT | 90% | 1 |
| TURN OFF THE TV | 80% | 2 |
| ISSUE DISCOUNT COUPONS OF RESTAURANT B | 60% | 3 |
| ISSUE DISCOUNT COUPONS OF RESTAURANT A | 57% | 4 |
| NOTIFY THE ELECTRIC-POWER DEMANDER OF EVENT B | 40% | 5 |
| LOWER THE TEMPERATURE SETTING OF THE AIR CONDITIONER | 32% | 6 |
| ISSUE DISCOUNT COUPONS OF DEPARTMENT STORE B | 20% | 7 |
| ISSUE DISCOUNT COUPONS OF DEPARTMENT STORE A | 12% | 8 |
| TURN OFF THE PERSONAL COMPUTER | 11% | 9 |
| NOTIFY THE ELECTRIC-POWER DEMANDER OF EVENT A | 5% | 10 |
| ⋮ | | |

FIG.6

POWER MANAGEMENT APPARATUS, POWER MANAGEMENT METHOD AND DEMAND NOTIFICATION APPARATUS

BACKGROUND

The present technology relates to a power management apparatus, a power management method and a demand notification apparatus.

In the past, in a number of countries, operations to supply electric power to electric-power demanders were carried out monopolistically by power companies. In recent years, however, the competition principle is introduced to electric-power businesses in order to carry out the electric-power businesses with a higher degree of efficiency and with the purpose of supplying electric power to electric-power demanders at lower prices. The competition principle is introduced to the electric-power businesses carried out by the power companies by letting business operators of businesses other than the electric-power businesses participate in power retail sales businesses in order to realize and promote future-power transactions.

In a future-power transaction, typically, the amount of electric power required in the future is forecasted in advance and the electric power is sold and purchased in a power market on the following day or within 24 hours from the forecasting. Thus, in order for a business operator carrying out power retail sales businesses and future-power transactions to make a big profit by giving priority to the electric-power businesses, it is necessary to forecast a future demand for electric power with a high degree of accuracy.

In accordance with a proposed power total demand forecasting apparatus for forecasting a total demand for electric power on the basis of a technology for forecasting a future demand for electric power, meteorological variables such as past temperatures of the air and past degrees of humidity as well as data representing the total amount of electric power demanded in the past are acquired and, in addition, a learning process is carried out by making use of a neural network. For more information on this power total demand forecasting apparatus, refer to Japanese Patent Laid-open No. Hei 5-18995.

SUMMARY

The power total demand forecasting apparatus disclosed in Japanese Patent Laid-open No. Hei 5-18995 forecasts a total demand for electric power on the basis of past meteorological data and data representing the total amount of electric power demanded in the past. Since the demand for electric power is closely related to the meteorological data such as the average temperature of the air and the average degree of humidity, by making use of the meteorological data, the demand for electric power can be forecasted to a certain degree.

Since the actual weather may be different from a forecasted one in some cases, however, if the demand for electric power is forecasted on the meteorological data and the like, the forecasted demand for electric power may be much different from the actual demand for electric power.

It is thus an aim of the present technology addressing the problems, which are described above, to provide a power management apparatus capable of managing electric power so that the actual demand for electric power is made close to the forecasted demand for electric power, a power management method to be adopted by the power management apparatus and a demand notification apparatus to be used in conjunction with the power management apparatus.

In order to solve the problems described above, a first technology provides a power management apparatus including:

a power-demand forecasting section configured to forecast an amount of electric power to be consumed by an electric-power demander at a future time;

a power measurement section configured to acquire the amount of electric power consumed by the electric-power demander at the time;

a demand control section configured to determine a demand for urging the electric-power demander to adjust the amount of electric power consumed by the electric-power demander on the basis of the electric-power amount forecasted by the power-demand forecasting section and the electric-power amount acquired by the power measurement section; and a demand issuance section configured to issue the demand determined by the demand control section to the electric-power demander.

In addition, a second technology provides a power management method including:

forecasting the amount of electric power to be consumed by an electric-power demander at a future time; measuring the amount of electric power consumed by the electric-power demander at the time;

determining a demand to be issued to the electric-power demander on the basis of the forecasted amount of electric power and the measured amount of electric power; and issuing the determined demand.

On top of that, a third technology provides a demand notification apparatus having a communication section configured to receive a demand transmitted by a power management apparatus and a notification section configured to notify an electric-power demander of the demand wherein the power management apparatus includes:

a power-demand forecasting section configured to forecast the amount of electric power to be consumed by the electric-power demander at a future time;

a power measurement section configured to measure the amount of electric power consumed by the electric-power demander at the time;

a demand control section configured to determine the demand to be issued to the electric-power demander on the basis of the electric-power amount forecasted by the power-demand forecasting section and the electric-power amount measured by the power measurement section; and a demand issuance section configured to issue the demand determined by the demand control section to the electric-power demander.

In accordance with the technologies described above, the amount of electric power consumed by the electric-power demander can be adjusted to a forecasted amount of electric power.

DETAILED DESCRIPTION OF THE PREFERRED EMBODIMENT

An embodiment of the present technology is explained below by referring to the diagrams. However, implementations of the present technology are by no means limited to the embodiment. It is to be noted that the embodiment is explained in chapters arranged in the following order.
1: Embodiment
1-1: Outline of Power Transactions
1-2: Outline of Power Management Carried Out by Issuing Demands
1-3: Configuration of the Power Management Apparatus
1-4: Configuration of the Demand Notification Apparatus
1-5: Power Management Carried Out by Issuing Demands
2: Typical Modifications

1: Embodiment

1-1: Outline of Power Transactions

A power management apparatus according to an embodiment of the present technology is used for obtaining electric power by performing the so-called electric-power transaction which is a transaction carried out in advance as a transaction of power electric to be delivered. Thus, first of all, an outline of an electric-power transaction is explained. The electric-power transaction can be a spot transaction carried out in a spot market or a preceding-hours transaction carried out in a preceding-hours market. The spot transaction is a transaction of electric power consumed typically on the following day or the day after the following day. The spot market is a market for such spot transactions. On the other hand, the preceding-hours transaction is a transaction of electric power consumed typically several hours after the transaction day. The preceding-hours market is a market for such preceding-hour transactions. A power management apparatus according to the embodiment of the present technology is used for obtaining electric power by carrying out a spot transaction.

The spot transaction is carried out by typically adoption of a method described as follows. In the case of a spot transaction, the transaction object is electric power to be delivered on the following day. Thus, the transaction implementation day is the day following a day on which the transaction is carried out. If a day is divided into 30-minute units, a day includes 48 segments which are each a 30-minute unit and, on a day, transactions of 48 commodities are carried out. Every morning, from 8:00 AM to 9:30 AM, tenders of electric power for the following day are carried out. At 9:30, the transactions go through. It is to be noted that, on Friday, transactions are carried out for electric power to be delivered on Saturday (that is, the following day), Sunday (that is, the day after the following day) and Monday (that is, the day after the day after the following day).

A tender is carried out by showing a price and the amount of electric power. A transaction and a delivery are carried out typically in 1000 kw units. The price of 1 kwh electric power is expressed in sen units. For example, if a contract has been made for 600 kwh with the price of 1 kw electric power set at 7 yen and 48 sen during a time segment from 13:00 to 14:00, the transaction price of 600 kwh electric power is 600 kwh×(7 yen and 48 sen)/kwh=8,976 yen. If a contract has been made for 600 kwh with the price of 1 kw electric power set at 7 yen and 48 sen during a time segment from 13:00 to 13:30, on the other hand, the transaction price of 600 kwh electric power is 600 kwh×(7 yen and 48 sen)/kwh=4,488 yen.

It is to be noted that, if the electric power procured by carrying out a spot transaction is insufficient on the transaction implementation day, on the transaction implementation day, an electric-power transaction is carried out on a real-time basis in order to procure electric power. The price of electric power on the transaction implementation day is normally high in comparison with the price of electric power procured by carrying out a spot transaction. It is thus desirable to carry out no electric-power transaction on the transaction implementation day if possible.

1-2: Outline of Power Management Carried Out by Issuing Demands

The power management apparatus according to the embodiment of the present technology forecasts the amount of electric power to be demanded on the transaction implementation day and makes use of the forecasted amount in a spot transaction carried out on the day preceding the transaction implementation day. The electric-power demand forecasted for the spot transaction is referred to as a first forecasted power demand. In addition, the forecasting process to find the first forecasted power demand is referred to as first power demand forecasting. The spot transaction is carried out on the basis of the first forecasted power demand.

As will be described later in detail, the demand for electric power is forecasted on the basis of, among others, the amount of electric power consumed in the past and the past meteorological information. Thus, if the weather of the transaction implementation day is different from the forecasted one, the difference will cause an error between the forecasted power demand and the amount of electric power actually demanded on the transaction implementation day. For example, the first power demand forecasting is carried out on the basis of a low temperature of the air so that the first power forecasting results in a low first forecasted power demand. Since the temperature of the air on the transaction implementation day is high so that the electric-power demander much requires a number of air conditioners, however, the amount of electric power actually demanded on the transaction implementation day becomes inevitably larger than the forecasted power demand in some cases.

In order to solve the problem described above, in accordance with the present technology, power demand forecasting is carried out again after the first power demand forecasting. The power demand forecasting carried out again after the first power demand forecasting is referred to as second power demand forecasting. The second power demand forecasting is carried out typically on the transaction implementation day. A power demand forecasted by carrying out the second power demand forecasting is referred to as a second forecasted power demand.

Then, the first forecasted power demand is compared with the second forecasted power demand in order to determine whether or not there is an error between the first forecasted power demand and the second forecasted power demand. If such an error exists, a demand is issued to the electric-power demander in order to request the electric-power demander to eliminate the error. The demand is a request urging the electric-power demander to carry out a variety of operations in order to adjust the amount of demanded electric power. By the way, the electric-power demander is the user consuming electric power. The electric-power demander obtains benefits from electric-power management carried out by the power management apparatus according to the embodiment of the present technology. The electric-power demander includes individuals, families, communities and organizations, to mention a few.

If the first forecasted power demand is low in comparison with the second forecasted power demand, a demand is issued to the electric-power demander in order to request the electric-power demander to reduce the demand for electric power to be consumed on the transaction implementation day. If the first forecasted power demand is high in comparison with the second forecasted power demand, on the other hand, a demand is issued to the electric-power demander in order to request the electric-power demander to raise the demand for electric power to be consumed on the transaction implementation day. The electric-power demander carries out operations according to the demand. If the error between the first forecasted power demand and the second forecasted power demand can be eliminated, it is no longer necessary to carry out an electric-power transaction on the transaction implementation day, and cost can be saved.

1-3: Configuration of the Power Management Apparatus

Figure 1:
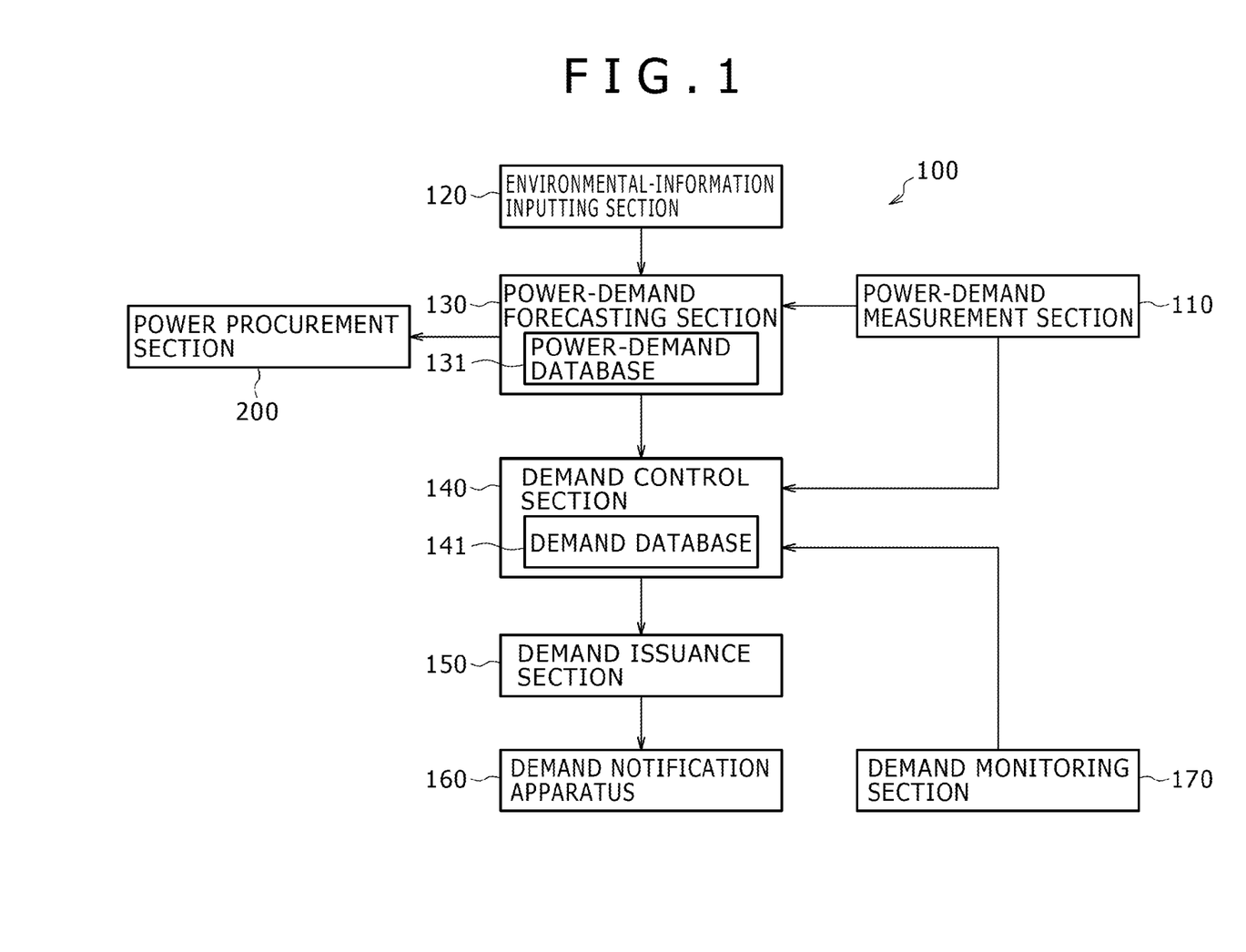
FIG. 1 is a block diagram showing the configuration of a power management apparatus.

Next, the configuration of a power management apparatus 100 according to the embodiment of the present technology is explained as follows. FIG. 1 is a block diagram showing the configuration of the power management apparatus 100 for carrying out management of electric power by issuing demands to electric-power demanders. As shown in the figure, the power management apparatus 100 includes a power-demand measurement section 110, an environmental-information inputting section 120, a power-demand forecasting section 130, a demand control section 140, a demand issuance section 150, a demand notification apparatus 160 and a demand monitoring section 170.

The power-demand measurement section 110, the environmental-information inputting section 120, the power-demand forecasting section 130 and the demand control section 140 are each configured to include typically a CPU (Central Processing Unit), a RAM (Random Access Memory) and a ROM (Read Only Memory). The ROM is used for storing programs to be read out and executed by the CPU. The RAM is used as a work memory of the CPU. In order to carry out processing of a section employed in the power management apparatus 100, the CPU employed in the section executes the programs stored in the ROM of the section.

The power-demand measurement section 110 is connected to power measurement equipment, which is used for measuring the amount of electric power consumed by the electric-power demander, through a network such as the Internet. The power measurement equipment is provided typically at the home of the electric-power demander. Thus, the power-demand measurement section 110 is capable of acquiring the amount of electric power consumed by the electric-power demander from the power measurement equipment. Also referred to as an electric-power demand, this amount of electric power to be consumed by the electric-power demander is the amount of electric power required by the electric-power demander. The power-demand measurement section 110 corresponds to a power measurement section described in a claim of this patent specification. It is to be noted that the power measurement equipment is capable of measuring the amount of electric power consumed by the electric-power demander because the power measurement equipment typically has the function of a current meter and the function of a voltage meter. In addition, the amount of electric power can also be measured by acquiring the waveform of a current and analyzing the waveform.

If the electric-power demander has a power generation facility, the power-demand measurement section 110 is connected to generated-power measurement equipment for measuring the amount of electric power generated by the power generation facility. If the electric-power demander has a power accumulation facility, the power-demand measurement section 110 is also connected to accumulated-power measurement equipment for measuring the amount of electric power accumulated in the power accumulation facility. Thus, the power-demand measurement section 110 is capable of acquiring the amount of electric power generated by the power generation facility and the amount of electric power accumulated in the power accumulation facility. Then, from the amount of electric power consumed by the electric-power demander, the amount of electric power generated by the power generation facility and the amount of electric power accumulated in the power accumulation facility, the power-demand measurement section 110 computes an electric-power demand which is the amount of electric power to be procured by the electric-power demander. The power-demand measurement section 110 then supplies the computed electric-power demand to the power-demand forecasting section 130.

It is to be noted that, if the electric-power demander has a power generation facility and a power accumulation facility so that the electric power generated by the power generation facility and the electric power accumulated in the power accumulation facility are all allotted to electric power to be consumed by the home of the electric-power demander, the electric-power demand is equal to (the amount of electric power to be consumed)+(the amount of electric power generated by the power generation facility)+(the amount of electric power discharged from the power accumulation facility). If the electric-power demander has a power generation facility only so that the electric power generated by the power generation facility is all allotted to electric power to be consumed by the home of the electric-power demander, the electric-power demand is equal to (the amount of electric power to be consumed)+(the amount of electric power generated by the power generation facility). If the electric-power demander has a power accumulation facility only so that the electric power accumulated in the power accumulation facility is all allotted to electric power to be consumed by the home of the electric-power demander, the electric-power demand is equal to (the amount of electric power to be consumed)+(the amount of electric power discharged from the power accumulation facility).

It is to be noted that the power accumulation facility can be electrically charged with typically purchased electric power. In addition, if the electric-power demander has neither a power generation facility nor a power accumulation facility, the electric-power demand is equal to the amount of electric power to be consumed.

It is to be noted that the power accumulation facility is typically configured to include a storage battery module for accumulating electric charge and an accumulated-charge control section configured to control and managing the electric charge accumulated in the module. The storage battery module can be any battery as long as the battery allows electric charge to be electrically accumulated in the battery and the accumulated electric charge to be electrically discharged from the battery. Typical examples of the storage battery module are a lithium ion secondary battery, a lithium ion polymer secondary battery and a nickel hydrogen battery.

The power generation facility is a facility for generating electric power by conversion of power other than electric power into the generated electric power. It is desirable that the power other than electric power is the so-called natural energy or the so-called renewable energy. That is to say, it is desirable that the power generation facility is a facility for generating electric power by conversion of the energy having small environmental loads into the generated electric power. Typical examples of the natural energy or the renewable energy are energies generated by sunlight, sun heat, wind power, hydraulic power, micro hydraulic power, sea-tide power, wave power, water-temperature differences, ocean currents, biomasses, geothermal heat, sounds and vibrations, to mention a few. In addition, the power generation facility can also be typically an exercise bike having a function for generating electric power or a power generation floor having a mechanism which generates electric power when a person is walking on the floor.

The description is continued back to the explanation of the power management apparatus 100 as follows. The environmental-information inputting section 120 is a section configured to obtain information on the environment and supplying the information to the power-demand forecasting section 130. The information on the environment is meteorological information such as the weather condition, the temperature of the air, the humidity, a rainfall amount, a wind force and the amount of sunlight, to mention a few. As commonly known, the weather condition can be a fair weather, a cloudy weather, a rainy weather, a snowy weather or another condition of the weather.

The environmental-information inputting section 120 may typically acquire meteorological information from a meteorological bureau or the like through a network such as the Internet and make use of the meteorological information as the information on the environment. In addition, the environmental-information inputting section 120 may be connected to a variety of measurement meters and acquire the meteorological information from the measurement meters. The measurement meters include an air-temperature meter, a humidity meter, a rainfall-amount meter and a wind-force meter, to mention a few. On top of that, the environmental-information inputting section 120 may also retrieve the meteorological information from a meteorological-information database of an ordinary enterprise.

The power-demand forecasting section 130 is a section configured to carry out the first power demand forecasting and the second power demand forecasting which have been explained before. As described earlier, the first power demand forecasting is a process of forecasting the electric-power demand made by the electric-power demander as an electric-power demand for the transaction implementation day of a spot transaction. The power-demand forecasting section 130 has a clock function and calendar information. Thus, the power-demand forecasting section 130 is capable of grasping present, past and future times as well as present, past and future days.

The power-demand forecasting section 130 is provided with a power-demand database 131. The power-demand forecasting section 130 stores a past electric-power demand received from the power-demand measurement section 110 and the environmental information received from the environmental-information inputting section 120 in the power-demand database 131 by associating the past electric-power demand and the environmental information with a date on which the demand and the information are received as well as a time at which the demand and the information are received. The power-demand forecasting section 130 forecasts an electric-power demand for a forecasting time of the electric-power demander by referring to the power-demand database 131.

The power-demand forecasting section 130 forecasts a demand for electric power on the basis of information stored in the power-demand database 131 and by adoption of, among others, a learning process making use of commonly known neural network processing, an existing learning algorithm and a recursive learning process as described in Japanese Patent Laid-open No. Hei 5-18995. The neural network processing is an information processing mechanism constructed by simulating the mechanism of the human brain to serve as an information processing mechanism capable of recognizing a pattern and carrying out forecasting.

By forecasting a demand for electric power by carrying out such learning processes, for example, the following typical demands for electric power can be forecasted:

'Every Tuesday and every Saturday, the electric-power demander raises an electric-power demand not higher than 5 kw.'

'From July to September, when the temperature of the air is not lower than 30 degrees Celsius, the demand for electric power is not lower than 10 kw.'

'On the third day of each month, the demand for electric power is about 3 kw.'

It is to be noted that, as demands for electric power and information on the environment are stored in the power-demand database 131, the amount of information that can be referred to also increases as well. Thus, the degree of precision at which the forecasting is performed by carrying out the learning processes is also raised as well.

The first forecasted power demand forecasted by the power-demand forecasting section 130 is typically supplied to a power procurement section 200, which is used for procuring electric power, through an external communication. The power procurement section 200 is connected to a power related business operator, which supplies electric power, through a network or the like. Then, the power procurement section 200 transmits the first forecasted power demand forecasted by the power-demand forecasting section 130 to the power related business operator as a demand for electric power to be procured.

The power related business operator is an enterprise for supplying electric power to the electric-power demander. The power related business operator generates, transforms, transmits, distributes, sells and purchases electric power and carries out other power related businesses. The power related business operator includes a power company, a power generation company, a power transmission company, a power distribution company and a power retail sales company. Then, for example, the power retail sales company included in the power related business operator carries out an electric-power transaction based on the result of the electric-power demand forecasting. In some cases, the forecasted electric-power demand is used in a power retail sales company but, in other cases, the forecasted electric-power demand is used in a power company. Finally, the power related business operator supplies electric power to every electric-power demander at an amount according to the electric-power transaction.

Figure 2:
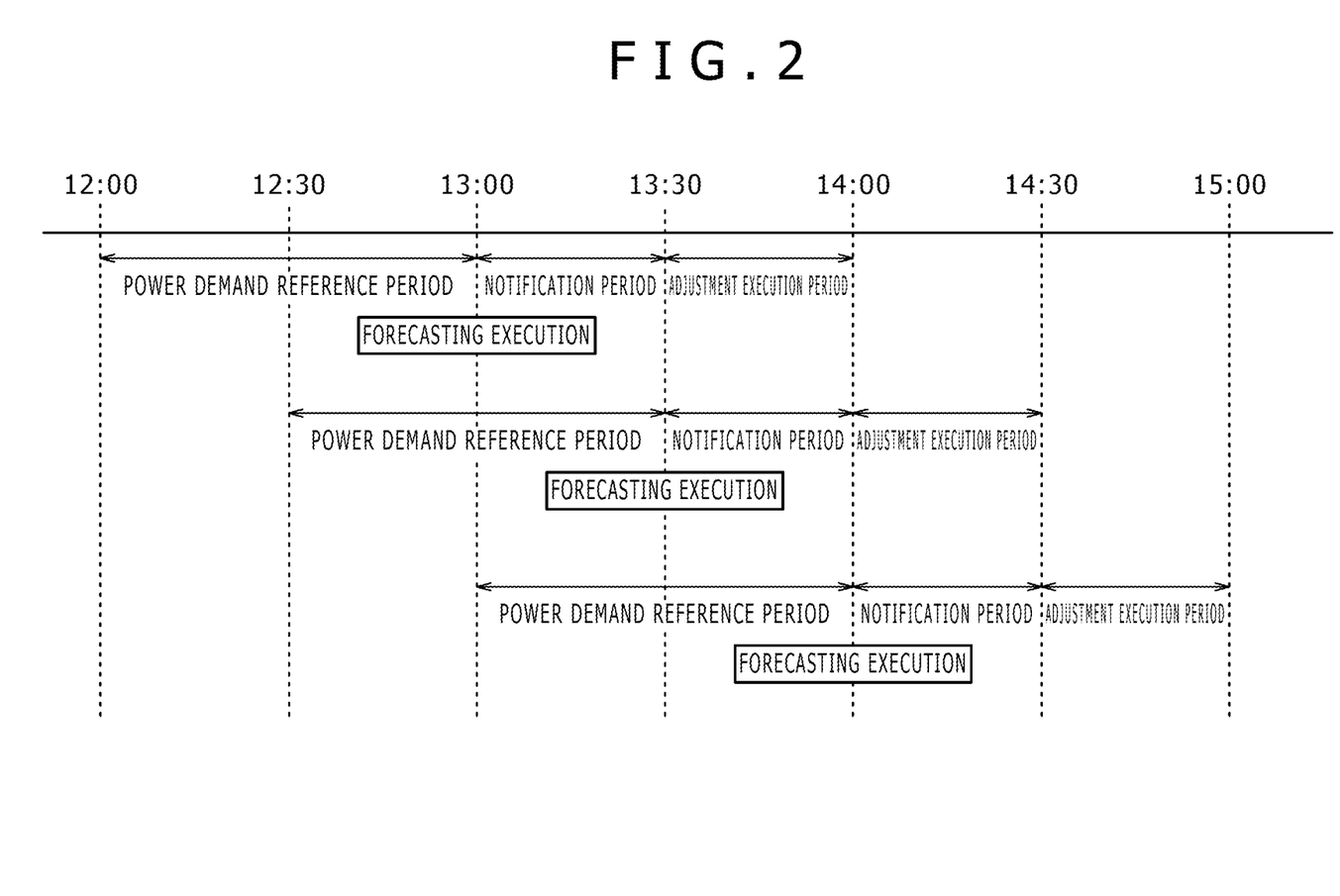
FIG. 2 is an explanatory diagram to be referred to in description of forecasting of a demand for electric power.

FIG. 2 is an explanatory diagram referred to in the following description of forecasting of a demand for electric power. On the transaction implementation day, a second forecasted power demand made for an adjustment execution period is found on the basis of an electric-power demand made for a power demand reference period which is a period having a length determined in advance. The adjustment execution period is a time period used for adjusting a demand for electric power by issuing a demand.

On the basis of the first forecasted power demand, electric power is procured in advance by carrying out a spot transaction on the preceding day or before the preceding day. Then, later on, on the transaction implementation day, the second power demand forecasting is carried out in order to find the second forecasted power demand. Subsequently, an error of the forecasted electric-power demand is found from the difference between the first forecasted power demand and the second forecasted power demand. Finally, the error representing the difference in electric power is adjusted by issuance of a command.

For example, the forecasted electric-power demand made for the adjustment execution period is found from a change rate of the forecasted electric-power demand made for the power demand reference period. This forecasted electric-power demand made for the adjustment execution period is used as the second forecasted power demand. The second power demand forecasting is typically carried out at the end of the lapse of the power demand reference period. The second forecasted power demand is supplied to the demand control section 140.

It is to be noted that, a demand notification period is inserted between the power demand reference period and the adjustment execution period. The demand notification period is a period for notifying the electric-power demander of a demand for adjusting the power demand made for the adjustment execution period.

In FIG. 2, the second forecasted power demand made for the adjustment execution period of 13:30 to 14:00 is found from the electric-power demand made for the power demand reference period of 12:00 to 13:00. The forecasting is carried out at 13:00. Then, between 13:00 and 13:30, the electric-power demander is notified of a demand for adjusting the amount of electric power consumed in a period of 13:30 to 14:00.

Subsequently, the second forecasted power demand made for the adjustment execution period of 14:00 to 14:30 is found from the electric-power demand made for the power demand reference period of 12:30 to 13:30. The forecasting is carried out at 13:30. Then, between 13:30 and 14:00, the electric-power demander is notified of a demand for adjusting the amount of electric power consumed in a period of 14:00 to 14:30.

Subsequently, the second forecasted power demand made for the adjustment execution period of 14:30 to 15:00 is found from the electric-power demand made for the power demand reference period of 13:00 to 14:00. The forecasting is carried out at 14:00. Then, between 14:00 and 14:30, the electric-power demander is notified of a demand for adjusting the amount of electric power consumed in a period of 14:30 to 15:00.

As described above, the computations of the second forecasted power demand are carried out consecutively for one day on the transaction implementation day, that is, from 0:00 to 24:00 (or 0:00). It is to be noted that the lengths of the power demand reference period, the demand notification period and the adjustment execution period which are shown in FIG. 2 are typical. That is to say, the lengths of the power demand reference period, the demand notification period and the adjustment execution period are by no means limited to those shown in FIG. 2. In other words, the lengths can be increased or decreased.

The description is continued back to the explanation of the power management apparatus 100 as follows. The demand control section 140 computes a difference between the first forecasted power demand received from the power-demand forecasting section 130 and the second forecasted power demand found by carrying out the second power demand forecasting. In the following description, this difference is referred to as an electric-power difference. If the first forecasted power demand is smaller than the second forecasted power demand, the electric-power difference has a negative sign indicating that the electric power is not sufficient. If the first forecasted power demand is greater than the second forecasted power demand, on the other hand, the electric-power difference has a positive sign indicating that the electric power is more than needed.

That is to say, the electric-power difference indicates whether the amount of electric power procured for the day is insufficient or more than needed. As explained before, this amount of electric power has been computed on the basis of the first forecasted power demand found in advance.

In addition, the demand control section 140 holds various kinds of information in advance. The information includes the type of electrical equipment used by the electric-power demander serving as the object of electric-power management, the number of pieces of such equipment and the amount of electric power consumed by each piece of such equipment. If the electrical equipment is equipment having a plurality of operating modes, the information includes the amount of electric power consumed by each piece of such equipment for each of the operating modes.

The business operator rendering a service based on the present technology may visit typically the homes of electric-power demanders in order to acquire pieces of such information and store them in the demand control section 140. In addition, when the contract of a service based on the present technology is made, the electric-power demander can be requested to provide the business operator with such information which may then be stored in the demand control section 140. On top of that, the information may also be obtained automatically by making use of an equipment sensor or the like.

Typically, the equipment sensor is configured as an IC (Integrated Circuit) or the like and installed on a power distribution board of the home of the electric-power demander. The equipment sensor detects which pieces of electrical equipment each connected to the power distribution board through a receptacle outlet are operating currently. In addition, the equipment sensor measures the amount of electric power consumed by each detected electrical equipment which is operating currently. The equipment sensor measures the magnitude of a current flowing through the power distribution board in order to obtain the waveform of the current. The waveform of the current flowing through the power distribution board varies typically from electrical-equipment type to electrical-equipment type and from electrical-equipment manufacturer to electrical-equipment manufacturer. The equipment sensor has typically pre-stored the waveform of a current which is flowing when the electrical equipment is operating normally. Thus, by comparing the pre-stored waveform with the waveform of a current supplied to the electrical equipment in a power supplying operation, the equipment sensor is capable of determining the type of electrical equipment connected to the power distribution board and put in an operating state. In addition, the equipment sensor measures the amount of electrical power consumed by the electrical equipment on the basis of the acquired current waveform.

As described above, the equipment sensor is capable of identifying what electrical equipment is connected to the power distribution board, identifying which electrical equipment is operating and finding the amount of electrical power consumed by the operating electrical equipment. The equipment sensor transmits these pieces of information to the demand control section 140 of the power management apparatus 100 through a network such as the Internet.

In addition, the operations to identify what electrical equipment is connected to the power distribution board, identify which electrical equipment is operating and measure the amount of electrical power consumed by the operating electrical equipment can be carried out not necessarily by the equipment sensor, but by any other means as long as the other means is capable of carrying out the operations. That is to say, the operations can be carried out by adoption of another method such as a method making use of the so-called smart tap.

The smart tap is a power-consumption measurement apparatus including an embedded electrical-power sensor and an embedded communication module. The smart tap is used as follows. The smart tap is plugged into a receptacle outlet in advance and connected to electrical equipment whose power consumption is to be measured. The smart tap is capable of measuring and analyzing the power consumption state of each electrical equipment on a real-time basis. Then, the smart tap transmits data representing results of the measurements and the analyses to the power management apparatus 100 by making use of typically the communication module embedded in the smart tap. The waveform of a current flowing with the electrical equipment put in an operating state and the like vary from electrical-equipment type to electrical-equipment type. Thus, from the data representing results of each measurements and each analysis which are carried out by the smart tap, it is possible to identify the type of each connected electrical equipment and grasp the amount of electric power consumed by the electrical equipment.

The electrical equipment used at an ordinary home includes a TV receiver, audio equipment, a refrigerator, an electronic range, a washing machine, an air conditioner, a clothes iron, a drier, an electric stove, an electric brazier, an oven, an electric carpet, a personal computer, a copier, a facsimile and a printer and an air conditioner, to mention a few. In addition, the electrical equipment used at a premise and a commercial establishment or the like includes lighting equipment, an air conditioner and transport equipment such as an elevator. It is to be noted that the electrical equipment is by no means limited those used at an ordinary home and a premise, a commercial establishment or the like. That is to say, the electrical equipment can be any other equipment as long as the other equipment carries out operations consuming electric power.

The description is continued back to the explanation of the demand control section 140 as follows. In accordance with the electric-power difference, the demand control section 140 determines a demand to be issued to the electric-power demander. As described before, the demand is a request urging the electric-power demander to carry out a variety of operations in order to adjust the amount of electric power consumed by the electric-power demander. The demand control section 140 has a demand database 141 used for storing a history associating demands issued in the past to every electric-power demander with operations carried out by the electric-power demander in response to the demands. The demand control section 140 determines a demand to be issued to an electric-power demander by referring to the history stored for the electric-power demander.

If the electric-power difference is a negative difference, that is, if the first forecasted power demand is smaller than the second forecasted power demand, the demand issued to the electric-power demander requests the electric-power demander to reduce the amount of electric power consumed by the electric-power demander. For example, the demand requests the electric-power demander to turn off the power supply of electrical equipment and change the setting of electrical equipment. The demand also includes a coupon issued to a variety of premises and an event notification.

To put it concretely, the demand requesting the electric-power demander to turn off the power supply of electrical equipment is a request to turn off the power supplies of electrical equipment used by the electric-power demander. The electrical equipment used by the electric-power demander includes a TV receiver, an air conditioner, a personal computer and lights, to mention a few. By turning off the power supplies of the electrical equipment used by the electric-power demander, it is possible to reduce the amount of electric power consumed by the electric-power demander.

In addition, by merely changing the setting of electrical equipment used by an electric-power demander, it is possible to reduce the amount of electric power consumed by the electric-power demander without turning off the power supply of the electrical equipment. A typical example of the demand requesting the electric-power demander to change the setting of electrical equipment is a request to change the temperature setting of an air conditioner.

A typical example of the coupon issued to a variety of premises is a coupon issued to a restaurant as a coupon entitling a coupon recipient receiving the coupon from the restaurant to a discount offered by the restaurant or other services rendered by the restaurant. By issuing such a coupon, it is possible to provide the electric-power demander with an incentive to go out. If the electric-power demander goes out, the use of electrical equipment at the home of the electric-power demander is stopped. Thus, the amount of electric power consumed by the electric-power demander can be reduced. It is to be noted that the coupons can be distributed as electronic coupons by making use of emails.

The event notification is a notification of event details including the holding date/time of an event which can be a festival, any of a variety of musical events, a movie event, a sport event, a parade or any of a variety of traditional events. By notification of the holding of such an event, it is possible to provide the electric-power demander with an incentive to go out. If the electric-power demander is interested in the event and goes out, the use of electrical equipment at the home of the electric-power demander is stopped. Thus, the amount of electric power consumed by the electric-power demander can be reduced.

If the electric-power difference is a positive difference, that is, if the first forecasted power demand is greater than the second forecasted power demand or if the amount of procured electric power is greater than the amount of electric power to be consumed, on the other hand, the demand issued to the electric-power demander requests the electric-power demander to increase the amount of electric power consumed by the electric-power demander. A conceivable example of such a demand is a demand urging the electric-power demander to efficiently make use of electrical equipment. If the procured electric power is more than needed for example, the electric-power demander is requested to make use of the washing machine to wash clothes in advance so that, if the electric power is insufficient in the near future, the clothes have already been washed. By doing so, the amount of electric power consumed in the near future can be reduced. In this way, the electric power can be consumed with a high degree of efficiency.

Figure 3:
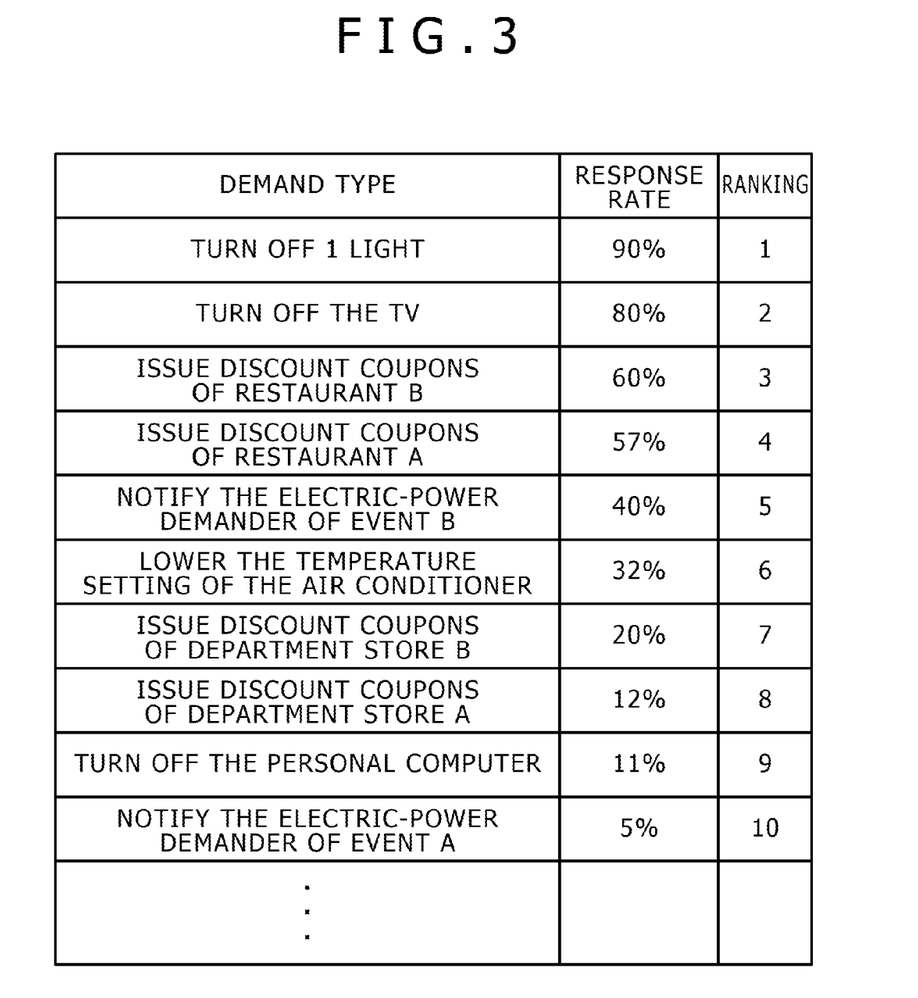
FIG. 3 is a diagram showing information stored in a demand database.

Next, the determination of a demand is explained as follows. As described above, the demand database 141 used for storing a history associating the types of demands issued in the past to every electric-power demander with operations carried out by the electric-power demander in response to the demands. Then, from the history associating the types of demands issued in the past to every electric-power demander with operations carried out by the electric-power demander in response to the demands, the demand control section 140 finds a demand and a response rate provided by the electric-power demander as the rate of a response to the demand as shown in FIG. 3. FIG. 3 is a table showing a relation between the type of each demand and a response rate representing a rate at which the electric-power demander correctly responds to the demand. The table shows such relations in an order of decreasing response rates. It is to be noted that the demands shown in the table are no more than typical demands. That is to say, more demands can be issued to the electric-power demander. In addition, the response rates and the order of the response rates are also typical.

On the basis of the demand database 141, the demand control section 140 determines a demand to be issued to the electric-power demander by giving high priorities to demands having high response rates. Thus, the demand control section 140 is capable of issuing a demand proper for the electric-power demander. As a result, it is possible to adjust the power consumption of the electric-power demander by issuing demands to the electric-power demander with a high degree of efficiency. In addition, it is possible to decrease the number of demands issued to the electric-power demander to serve as demands to which the electric-power demander is not willing to give a response or the electric-power demander is not capable of giving a response. It is thus possible to prevent the electric-power demander from feeling bothered by the demand issued to the electric-power demander.

It is to be noted that the demand monitoring section 170 to be described later supplies a state of responding to a demand determined by the demand control section 140 to the demand control section 140 as a feedback to the demand control section 140. The state of responding to a demand determined by the demand control section 140 is a state acquired by the demand monitoring section 170 as a state of the electric-power demander to which the demand has been issued. The demand control section 140 always updates the demand database 141 on the basis of such a feedback. Thus, the larger the number of services enjoyed as services according to the embodiment of the present technology, the higher the capability of issuing demands matching the favorite of the electric-power demander.

It is to be noted that the demand control section 140 needs to determine a demand to be issued to an electric-power demander by considering the amount of electric power consumed by electrical equipment owned by the electric-power demander. As described above, the demand control section 140 holds information in advance as information indicating, among others, the types of electrical equipment owned by the electric-power demander, the number of pieces of such electrical equipment and the amount of electric power consumed by each piece of such electrical equipment. In addition, from responses to demands issued in the past to the electric-power demander, it is also possible to grasp the amount of electric power which is saved by the electric-power demander when the electric-power demander goes out.

For example, if the electric-power difference is a negative difference of 20 wh, it is necessary to decrease the demand for electric energy by 20 wh. In this case, as explained before, the demand control section 140 determines a demand to be issued to the electric-power demander by giving high priorities to demands having high response rates and by referring to the amount of electric power consumed by each electrical equipment. If the demand is a request to turn off the power supply of electrical equipment for example, the amount of electric power consumed by each electrical equipment is referred to in order to determine which electric equipment is to be turned off so as to reduce the amount of electric energy by 20 wh. The amount of electric energy can be reduced by 20 wh by turning off a piece of electrical equipment or a plurality of pieces of electrical equipment.

In addition, there may be a case in which an electric-power demander must reduce the amount of electric energy by 20 wh but, for the electric-power demander, the demand to turn off the power supply of electrical equipment has a low response rate. In this case, a demand urging the electric-power demander to go out is selected. Typical examples of such a demand are an issued coupon and a notification of an event.

A demand to be issued to an electric-power demander can be determined by adoption of, among others, a learning process making use of commonly known neural network processing, an existing learning algorithm and a recursive learning process on the basis of, among other information, demands issued in the past to the electric-power demander, the rates of responses given by the electric-power demander as responses to the demands, the amount of electric power consumed by electrical equipment owned by the electric-power demander and the amount of electric power saved by the electric-power demander by going out.

Then, the demand control section 140 requests the demand issuance section 150 to issue a demand determined by the demand control section 140 to the electric-power demander. The demand issuance section 150 is connected to the demand notification apparatus 160 through a network such as the Internet. Subsequently, in order to notify the electric-power demander of the demand, the demand issuance section 150 transmits information on the demand to the demand notification apparatus 160 by way of the network.

The demand notification apparatus 160 is notification means for notifying the electric-power demander of the demand received from the demand issuance section 150. Typical examples of the demand notification means are a turning-on LED or the like, a variety of written messages such as emails and audio announcements. If the demand notification means is a turning-on LED or the like, the demand notification apparatus 160 serves a notification terminal provided with the LED. Conceivable examples of the notification terminal provided with an LED are gateway equipment having the LED and a receptacle plug having the LED.

If the demand notification means is a variety of written messages such as emails, the demand issuance section 150 serves as a message transmitting server whereas the demand notification apparatus 160 is a mail receiving terminal such as a mobile phone, a smart phone or a personal computer. If the demand notification means is audio announcements, the demand issuance section 150 serves as an audio-information transmitting apparatus whereas the demand notification apparatus 160 functions as an audio output apparatus provided with typically a speaker. In addition, in the case of a smart phone, applications can be installed in the smart phone in order to provide the smart phone with command notification functions of according to the embodiment of the present technology. The command notification functions include functions to turn on LEDs, generate sounds and transmit written messages. A concrete configuration of the demand notification apparatus 160 will be described later.

The demand monitoring section 170 is a section configured to monitor and grasp states at which the electric-power demander gives responses to demands issued to the electric-power demander. If the demand issued to the electric-power demander is a request to turn off the power supply of electrical equipment or change the setting of the electrical equipment, the demand monitoring section 170 acquires the amount of electric power consumed by the electrical equipment from a power-consumption measurement apparatus installed at the home of the electric-power demander to serve as an apparatus for measuring the amount of electric power consumed by the electric-power demander.

In addition, if the demand is coupons of a variety of premises, there is required a system for receiving information on the use of the coupons from, among other systems, a register system for managing the use of the coupons and payments at the premise and a POS (Point Of Sales) system. For example, by attaching a unique identifier to an electronic coupon transmitted to the electric-power demander as an email or the like, it is possible to verify which electronic coupon has been used. It is thus possible to determine whether or not the electric-power demander has responded to the demand.

If the demand is a notification of an event, a GPS (Global Positioning System) can typically be used to grasp the position of the electric-power demander so that is possible to determine whether or not the electric-power demander has gone out. The GPS includes a GPS transmitter and a GPS receiver. It is to be noted that, if the use of a coupon or the fact that the user has gone out cannot be verified, the demand monitoring section 170 may monitor and grasp the states at which the electric-power demander gives responses to demands issued to the electric-power demander on the basis of the power consumption obtained from the power-consumption measurement apparatus provided typically at the home of the electric-power demander as the power consumption of the electric-power demander. This is because, if the electric-power demander makes use of the coupon or goes out to see an event, the electrical equipment of the electric-power demander is not used so that the amount of electrical power consumed by the electric-power demander should decrease.

The demand monitoring section 170 acquires information on a response given by the electric-power demander as a response to a demand issued to the electric-power demander from the power-consumption measurement apparatus and supplies the information to the demand control section 140. The demand control section 140 stores the information in the demand database 141 and associates the information with the demand. Since the information on a response given by the electric-power demander as a response to a demand issued to the electric-power demander is stored in the demand database 141, the demand control section 140 is capable of issuing demands better matching the favorite of the electric-power demander.

The power management apparatus 100 is described above. The power management apparatus 100 is typically used in a HEMS (Home Energy Management System). The HEMS is a system for reducing the amount of consumed energy by utilizing an IT (Information Technology) to make the use of energy in an ordinary home efficient.

Figure 4:
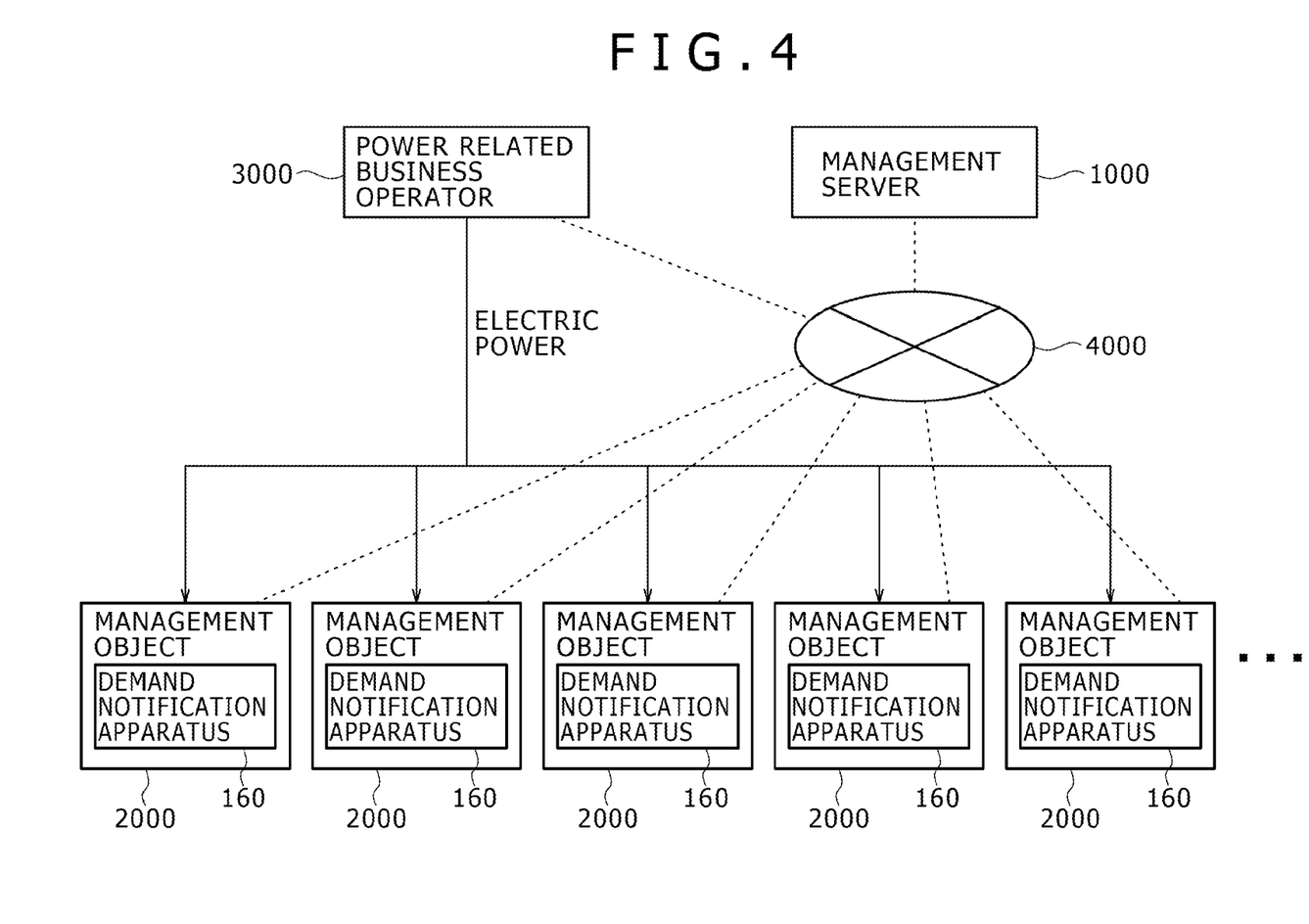
FIG. 4 is a block diagram showing an outline of an HEMS (Home Energy Management System) including the power management apparatus.

Next, an outline of the HEMS employing the power management apparatus 100 is explained by referring to FIG. 4. FIG. 4 is a diagram showing relations between a management server 1000 for carrying out electric-power management by executing the functions of the power management apparatus 100, a plurality of management objects 2000 and a power related business operator 3000. The management object 2000 is a construction at which the electric-power demander consumes electric power. Typical examples of the management object 2000 are a home, a mansion, a building, a commercial establishment, a floor of a building and a floor of a commercial establishment, to mention a few. A power-demand measurement section 110, an environmental-information inputting section 120, a power-demand forecasting section 130, a demand control section 140 and a demand issuance section 150 which compose a power management apparatus 100 are employed in the management server 1000 on the side of the business operator rendering services according to the embodiment of the present technology. That is to say, the management server 1000 carries out management of electric power by issuing demands to the management objects 2000.

As shown in FIG. 4, the management objects 2000 are put under the electric-power management carried out by the management server 1000. Thus, the management server 1000 carries out management of electric power on each of the management objects 2000. The management server 1000 is connected to the management objects 2000 through a network 4000 such as the Internet. The demand notification apparatus 160 is provided in the management object 2000. The demand issuance section 150 of the management server 1000 transmits a demand to the demand notification apparatus 160 of the management object 2000 by way of the network 4000.

The electric-power management according to the embodiment of the present technology is management for providing the electric-power demander with the so-called cloud service. The cloud service is a service rendered by a server existing in a network. The cloud service is a service rendered in one of ways of using a computer taking the Internet as a base. All required processing of the cloud service is basically carried out by the server existing in the Internet. The user does not store data in a personal computer, a smart phone, a mobile phone or the like. Instead, the user stores data in the server existing in the Internet. Thus, in a variety of environments, the user is capable of carrying out a variety of operations on the data stored in the server. The environments include a home, a company, a net cafe, a school and a going-out destination, to mention a few. On the other hand, the operations carried out on the data stored in the server existing in the Internet include an operation to make use of a service, an operation to browse the data, an operation to edit the data and an operation to upload other data to the server, to mention a few.

The power-related business operator 3000 includes a power company, a power generation business operator, a power transmission business operator, a power distribution business operator and a power retail-sales business operator which carry out businesses including generation of electric power, transformation of electric power, transmission of electric power, distribution of electric power, selling of electric power and purchasing of electric power as described before. The power related business operator 3000 is connected to the management server 1000 through the network 4000.

For example, a power retail-sales business operator serving as the power related business operator 3000 carries out transactions of electric power. The power related business operator 3000 then supplies electric power to the management objects 2000.

1-4: Configuration of the Demand Notification Apparatus

Figure 5A:
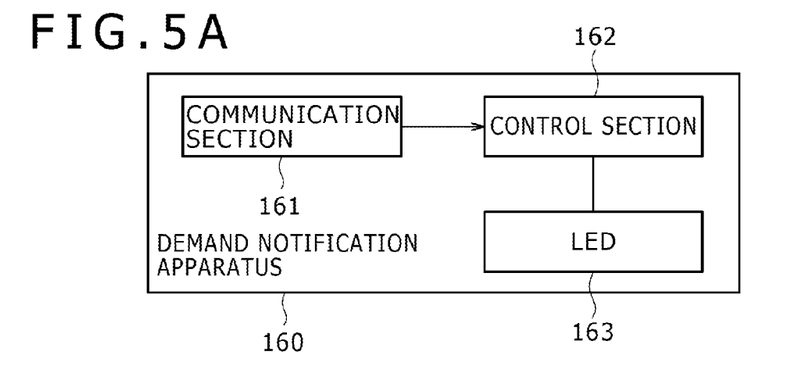
FIGS. 5A to 5C are a plurality of block diagrams each showing the configuration of a demand notification apparatus.
Figure 5B:
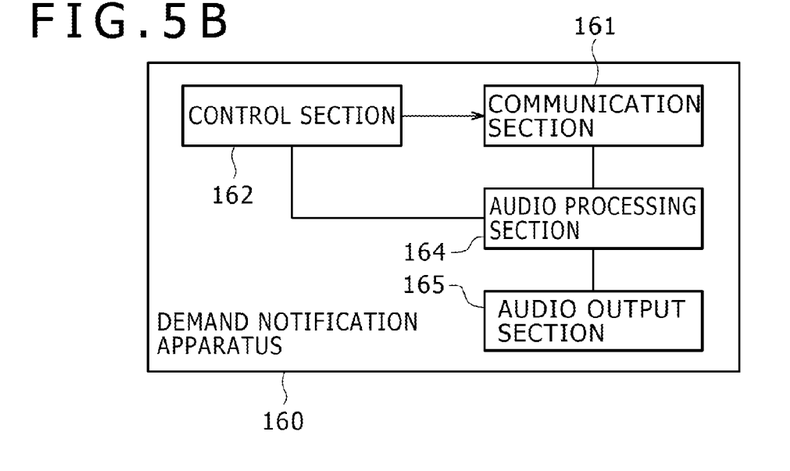
Figure 5C:
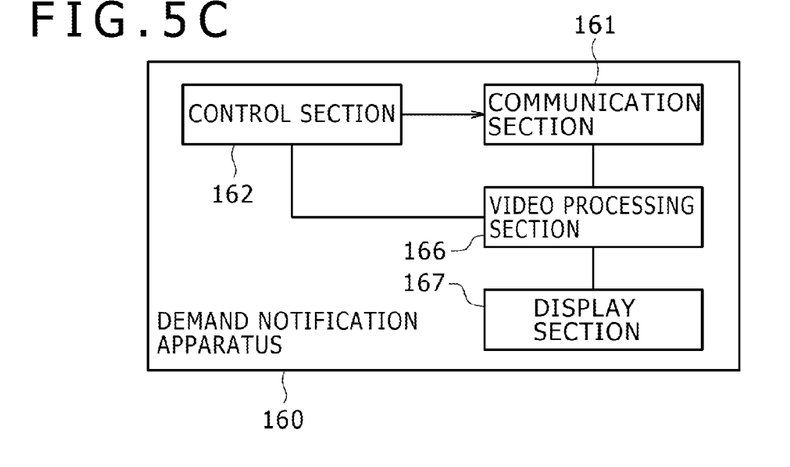

Next, the demand notification apparatus 160 employed in the power management apparatus 100 is explained as follows. FIGS. 5A to 5C are each a block diagram showing an outline configuration of the demand notification apparatus 160. To be more specific, FIG. 5A is a block diagram showing a first typical configuration of the demand notification apparatus 160. As shown in this figure, the demand notification apparatus 160 is configured to include a communication section 161, a control section 162 and an LED 163.

The communication section 161 is a communication module serving as a network interface. To put it concretely, the communication section 161 carries out communications with the demand issuance section 150 of the power management apparatus 100 through the network 4000 such as the Internet or a dedicated line typically on the basis of a protocol determined in advance. The communication method can be a wire-communication method, a radio LAN (Local Area Network) method, a Wi-Fi (Wireless Fidelity) method or a method of communications making use of a 3G line, to mention a few.

The control section 162 is configured to include typically a CPU, a RAM and a ROM. The ROM is used for storing programs to be read out and executed by the CPU. The RAM is used as a work memory of the CPU. In order to control all the sections employed in the demand notification apparatus 160, the CPU carries out various kinds of processing by execution of the programs stored in the ROM.

The LED 163 is a light emitting device or a plurality of light emitting devices. The LED 163 is turned on and off in accordance with control carried out by the control section 162. The LED 163 is turned on in order to notify the electric-power demander of a demand. In accordance with the demand issued to the electric-power demander, the control section 162 changes a turning-on count, a turning-on period, a turning-on color and the like. The turning-on count is the number of times the LED 163 is turned on. The turning-on period is the length of a period during which the LED 163 is turned on. The turning-on color is a color at which the LED 163 is turned on. In this way, it is possible to notify the electric-power demander of the demand.

FIG. 5B is a block diagram showing a second typical configuration of the demand notification apparatus 160. As shown in this figure, the demand notification apparatus 160 is configured to include a communication section 161, a control section 162, an audio processing section 164 and an audio output section 165. The communication section 161 and the control section 162 are identical with respectively the communication section 161 and the control section 162 which are employed in the first typical configuration. The communication section 161 receives audio data for notifying the electric-power demander of a demand. The audio data has been transmitted by the demand issuance section 150 to the demand notification apparatus 160 by way of the network 4000 such as the Internet. The communication section 161 supplies the audio data to the audio processing section 164. The audio processing section 164 carries out predetermined processing such as a decoding process and an amplification on the audio data, supplying the result of the processing to the audio output section 165.

The audio output section 165 is a speaker for outputting voices under control carried out by the control section 162. The audio output section 165 outputs an audio announcement expressing the demand. Typical examples of the audio announcement are "Turn of the TV during a period from 13:00 to 14:00," "Lower the temperature setting of the air conditioner by 1 degree Celsius during a period from 15:00 to 17:00" and "A festival is being held in front of the station." By outputting such an audio announcement, it is possible to notify the electric-power demander of the demand. In addition, the audio output section 165 may also output an alarming sound.

FIG. 5C is a block diagram showing a third typical configuration of the demand notification apparatus 160. As shown in this figure, the demand notification apparatus 160 is configured to include a communication section 161, a control section 162, a video processing section 166 and a display section 167. The communication section 161 and the control section 162 are identical with respectively the communication section 161 and the control section 162 which are employed in the first typical configuration. The communication section 161 receives video data for notifying the electric-power demander of a demand. The video data has been transmitted by the demand issuance section 150 to the demand notification apparatus 160 by way of the network 4000 such as the Internet. The communication section 161 supplies the video data to the video processing section 166. The video processing section 166 carries out predetermined processing on the video data and supplies the result of the processing to the display section 167.

The display section 167 is display means configured typically as an LCD (Liquid-Crystal Display), a PDP (Plasma Display Panel), an organic EL (Electro Luminance) panel or the like. Under control carried out by the control section 162, the display section 167 displays typically a written message describing details of the demand. Thus, it is possible to notify the electric-power demander of the demand.

However, configurations of the demand notification apparatus 160 are by no means limited to those shown in FIGS. 5A to 5C. By combining the first to third typical configurations for example, the demand notification apparatus 160 can also be configured to include the LED 163, the audio output section 165 and the display section 167. By combining the first to third typical configurations in this way, it is possible to create a new configuration in which, typically, the electric-power demander is notified of the demand as follows. The display section 167 displays a written message, the audio output section 165 outputs an audio announcement after the lapse of a time period determined in advance since the message, the audio output section 165 outputs an alarming sound after the lapse of another time period determined in advance since the announcement and the LED 163 turns on. Thus, the demander can be notified of the demand in a convincing way. It is to be noted that, any demand notification apparatus can be adopted as long as the demander can be notified of the demand.

In addition, in place of an independent apparatus, a receptacle plug can also be configured to include the first to third typical configurations. In this case, it is nice that the receptacle plug connected to electrical equipment receiving a demand notifies the electric-power demander of the demand.

1-5: Power Management Carried Out by Issuing Demands

Figure 6:
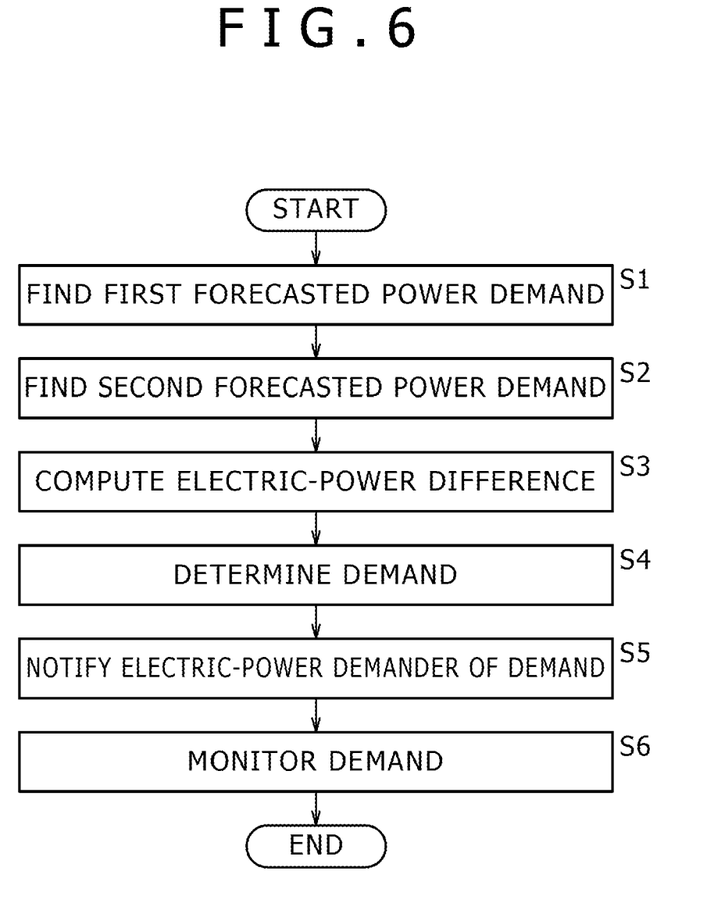
FIG. 6 shows a flowchart representing power management processing carried out by issuing demands.

Next, by referring to a flowchart shown in FIG. 6, the following description explains electric-power management carried out by the power management apparatus 100 described above by issuing commands to the electric-power demander. The electric-power management is carried out in procuring electric power in accordance with a spot transaction explained before.

First of all, at a step S1 of the flowchart, the power-demand forecasting section 130 carries out the first power demand forecasting in order to compute the first forecasted power demand to be used in a spot transaction explained earlier. The power-demand forecasting section 130 supplies the computed first forecasted power demand to the power procurement section 200. The power procurement section 200 transmits the first forecasted power demand to a power related business operator. Then, the power related business operator carries out a spot transaction and procures electric power for the following day which is the transaction implementation day. In addition, the first forecasted power demand is also supplied to the demand control section 140.

On the transaction implementation day, at the next step S2, on the basis of a power demand received from the power measurement section as the amount of electric power consumed during a power demand reference period on the transaction implementation day, the power-demand forecasting section 130 carries out the second power demand forecasting in order to find the second forecasted power demand which is the amount of electric power consumed during an adjustment execution period on the transaction implementation day. The power-demand forecasting section 130 supplies the second forecasted power demand obtained as a result of the second power demand forecasting to the demand control section 140.

Then, at the next step S3, the demand control section 140 computes the electric-power difference which is the difference between the second forecasted power demand found at the step S2 and the first forecasted power demand found at the step S1 for the spot transaction.

Subsequently, at the next step S4, on the basis of the electric-power difference, the demand control section 140 determines a demand for adjusting the amount of electric power consumed during the adjustment execution period. As described above, the demand control section 140 determines the demand by referring to the demand database 141. The demand database 141 is used for storing demands issued in the past by associating the demands with states in which the electric-power demander gives responses to the past demands.

Then, at the next step S5, the demand issuance section 150 issues the demand determined by the demand control section 140 at the step S4 to the demand notification apparatus 160 and a demand notification section notifies the electric-power demander of the demand. Subsequently, at the next step S6, the demand monitoring section 170 monitors and grasps the demand issued to the electric-power demander. As described above, the management of electric power is carried out by issuing a demand to the electric-power demander.

In accordance with the power management provided by the present technology, the electric-power demander can generally be guided to increase or decrease the amount of consumed electric power. Thus, in general, the amount of consumed electric power can be adjusted. As a result, a profit can be brought about to a power retail sales business operator. This is because electric power is procured in advance in accordance with a spot transaction and, if the amount of procured electric power is found insufficient on that day, additional electric power must be procured at a high price on a real-time basis. In addition, by decreasing the amount of consumed electric power, the amount of wasted electric power can be reduced.

The demand issued to the electric-power demander includes a request to turn off the power supply of electrical equipment, a coupon and a notification of an event. Since the demand does not show any concrete number to the electric-power demander, however, the electric-power demander can easily respond to the demand. Nevertheless, inclusion of a concrete number in a demand issued to the electric-power demander is by no means ruled out.

In addition, a demand such as a coupon or a notification of an event urges the electric-power demander to go out. Thus, it is possible to decrease the amount of consumed power and to advertise other businesses. On top of that, such a demand is capable of contributing to the enhancement of the electric-power business by associating the electric-power business with the other business. As described above, the electric-power management according to the embodiment of the present technology is carried out.

2: Typical Modifications

An embodiment of the present technology has been explained concretely so far. However, implementations of the present technology are by no means limited to the embodiment. That is to say, it is possible to make a variety of changes based on the technological concept of the present technology.

In accordance with the embodiment explained above, the power demand forecasting and the computation of the electric-power difference are carried out for every electric-power demander. However, in an electric-power transaction, a power retail sales business operator normally computes a sum of forecasted power demands made by a plurality of electric-power demanders each concluding a contract with the power retail sales business operator. Then, the power retail sales business operator procures electric power for the electric-power demanders in one electric-power transaction. Thus, the management of electric power is carried out by issuing demands to the electric-power demanders each concluding a contract with the power retail sales business operator in the same way as the embodiment in a batch operation by forecasting the demands for electric power and computing the electric-power differences. Then, the electric-power differences are distributed to the electric-power demanders and a demand is determined and issued to each of the electric-power demanders.

In addition, in accordance with the embodiment explained above, a demand is issued to an electric-power demander if an electric-power difference exists. However, it is also possible to provide a configuration in which the electric-power difference for an electric-power demander is compared with a threshold value determined in advance and a demand is issued to the electric-power demander only if the electric-power difference is found equal to or greater than the threshold value. Thus, in the case of a small electric-power difference, no demand is issued to the electric-power demander. As a result, it is possible to avoid a situation in which the electric-power demander feels uncomfortable because the electric-power demander receives demands frequently.

On top of that, in accordance with the embodiment explained above, the second power demand forecasting is carried out on the transaction implementation day. However, it is also possible to provide a configuration in which, for example, the second power demand forecasting is carried out on a day after the day preceding the transaction implementation day or the second power demand forecasting is carried out on the day preceding the transaction implementation day. In this configuration, the management of electric power is carried out on the transaction implementation day by issuing a demand to the electric-power demander.

The present technology can also be realized into the following implementations.

1. A power management apparatus including:
a power-demand forecasting section configured to forecast a power demand made by an electric-power demander at a future time;
a power measurement section configured to acquire a power consumption of the electric-power demander for the time;
a demand control section configured to determine a demand for urging the electric-power demander to adjust the amount of electric power consumed by the electric-power demander on the basis of the power demand forecasted by the power-demand forecasting section and the power consumption acquired by the power measurement section; and
a demand issuance section configured to issue the demand determined by the demand control section to the electric-power demander.

2. The power management apparatus according to implementation 1 wherein, if the forecasted power demand is smaller than the power consumption, the demand control section determines the demand for reducing the amount of electric power consumed by the electric-power demander.

3. The power management apparatus according to implementation 1 or 2 wherein the demand control section determines the demand for requesting the electric-power demander to limit use of electrical equipment.

4. The power management apparatus according to any one of implementations 1 to 3 wherein the demand control section determines the demand for requesting the electric-power demander to go out.

5. The power management apparatus according to any one of implementations 1 to 4 wherein, if the forecasted power demand is larger than the power consumption, the demand control section determines the demand for raising the amount of electric power consumed by the electric-power demander.

6. The power management apparatus according to any one of implementations 1 to 5 wherein, if the forecasted power demand is larger than the power consumption, the demand control section determines the demand for urging the electric-power demander to enhance use of electrical equipment.

7. The power management apparatus according to any one of implementations 1 to 6, the power management apparatus further including:

a demand monitoring section configured to grasp a state in which the electric-power demander responds to the demand; and
a demand database used for storing the demand issued by the demand issuance section and a state grasp by the demand monitoring section as the state in which the electric-power demander responds to the issued demand by associating the issued demand with the state,
wherein the demand control section determines the demand by referring to the demand database.

8. The power management apparatus according to any one of implementations 1 to 7, the power management apparatus further including a demand notification section configured to notify the electric-power demander of the demand issued by the demand issuance section.

9. A power management method including:
forecasting a power demand made by an electric-power demander at a future time;
measuring a power consumption of the electric-power demander for the time;
determining a demand to be issued to the electric-power demander on the basis of the forecasted power demand and the measured power consumption; and
issuing the determined demand.

10. A demand notification apparatus having a communication section configured to receive a demand transmitted by a power management apparatus and a notification section configured to notify an electric-power demander of the demand wherein the power management apparatus includes:
a power-demand forecasting section configured to forecast a power demand made by the electric-power demander at a future time;
a power measurement section configured to measure a power consumption of the electric-power demander for the time;
a demand control section configured to determine the demand for urging the electric-power demander to adjust the amount of electric power consumed by the electric-power demander on the basis of the power demand forecasted by the power-demand forecasting section and the power consumption measured by the power measurement section; and
a demand issuance section configured to issue the demand determined by the demand control section to the electric-power demander.

The present disclosure contains subject matter related to that disclosed in Japanese Priority Patent Application JP 2011-245413 filed in the Japan Patent Office on Nov. 9, 2010, the entire content of which is hereby incorporated by reference.

What is claimed is:
1. A power management apparatus comprising:
a central processing unit (CPU) configured to:
forecast, at a first time, a power demand to be made by an electric-power demander at a future time;
measure, at a second time, power consumed by said electric-power demander, the second time being between the first time and the future time;
determine a demand for urging said electric-power demander to adjust the amount of electric power consumed by said electric-power demander on the basis of said forecasted power demand and said measured power consumption, wherein, in an event said power demand forecasted at the first time is smaller than said power consumption measured at the second time, said CPU is configured to determine said demand to limit use of electrical equipment without turning off the power supply of said electrical equipment; and issue said determined demand to said electric-power demander.

2. The power management apparatus according to claim 1, wherein said CPU is configured to determine said demand for requesting said electric-power demander to move out of a location where said electric power is consumed.

3. The power management apparatus according to claim 1, wherein, in an event said power demand forecasted at the first time is larger than said power consumption measured at the second time, said CPU is configured to determine said demand for raising the amount of electric power consumed by said electric-power demander.

4. The power management apparatus according to claim 3, wherein, in an event said power demand forecasted at the first time is larger than said power consumption measured at the second time, said CPU is configured to determine said demand for urging said electric-power demander to enhance use of electrical equipment.

5. The power management apparatus according to claim 1, wherein said CPU is further configured to grasp a state in which said electric-power demander responds to said demand, and wherein said power management apparatus further comprises a demand database configured to store said demand issued by said CPU and said grasped state as said state in which said electric-power demander responds to said issued demand by associating said issued demand with said state, wherein said CPU is configured to determine said demand by referring to said demand database.

6. The power management apparatus according to claim 1, wherein said CPU is further configured to control to notification of said issued demand to said electric-power demander.

7. The power management apparatus according to claim 1, wherein said CPU is configured to determine a type of electrical equipment associated with said electric-power demander and an amount of power consumption by said electrical equipment.

8. A power management method comprising:

forecasting, by a central processing unit (CPU), at a first time, a power demand to be made by an electric-power demander at a future time;

measuring, by said CPU, at a second time, a power consumed by said electric-power demander, the second time being between the first time and the future time;

determining, by said CPU, a demand to be issued to said electric-power demander on the basis of said forecasted power demand and said measured power consumption, wherein, in an event said power demand forecasted at the first time is smaller than said power consumption measured at the second time, said CPU is configured to determine said demand to limit use of electrical equipment without turning off the power supply of said electrical equipment; and issuing, by said CPU, said determined demand.

9. A demand notification apparatus comprising:

a network interface configured to receive a demand transmitted by a power management apparatus, and a central processing unit (CPU) configured to:

control notification of said demand to an electric-power demander forecast, at a first time, a power demand to be made by said electric-power demander at a future time;

measure, at a second time, power consumed by said electric-power demander, the second time being between the first time and the future time;

determine said demand for urging said electric-power demander to adjust the amount of electric power consumed by said electric-power demander on the basis of said forecasted power demand and said measured power consumption, wherein, in an event said power demand forecasted at the first time is smaller than said power consumption measured at the second time, said CPU is configured to determine said demand to limit use of electrical equipment without turning off the power supply of said electrical equipment; and issue said determined demand to said electric-power demander.

* * * * *